(12) United States Patent
Simon et al.

(10) Patent No.: US 6,254,681 B1
(45) Date of Patent: Jul. 3, 2001

(54) CONTINUOUS PROCESSING PLANT FOR THE TREATMENT OF WORKPIECES

(75) Inventors: Martin Simon, Böblingen; Hans-Joachim Weinand, Ditzingen; Peter Abei, Altensteig, all of (DE)

(73) Assignee: Eisenmann Maschinenbau KG, Boblingen (DE)

( * ) Notice: Subject to any disclaimer, the term of this patent is extended or adjusted under 35 U.S.C. 154(b) by 0 days.

(21) Appl. No.: 09/023,735

(22) Filed: Feb. 13, 1998

(30) Foreign Application Priority Data

Feb. 17, 1997 (DE) ............................................. 197 06 175

(51) Int. Cl.$^7$ ........................................................ B05C 3/02
(52) U.S. Cl. ........................................ 118/423; 118/428
(58) Field of Search .................................. 118/423, 428, 118/425, 427

(56) References Cited

U.S. PATENT DOCUMENTS

| | | | | |
|---|---|---|---|---|
| 2,465,128 | * | 3/1949 | Starkey | 118/423 X |
| 2,552,612 | * | 5/1951 | Adams et al. | 118/56 X |
| 2,598,163 | * | 5/1952 | Halls | 118/423 X |
| 2,728,686 | * | 12/1955 | Borushko | 118/423 X |
| 2,738,321 | | 3/1956 | Finston . | |
| 2,750,923 | * | 6/1956 | Daniel | 118/423 |
| 4,831,962 | * | 5/1989 | Gros | 118/423 |

FOREIGN PATENT DOCUMENTS

| | | |
|---|---|---|
| 2332931 | 6/1977 | (FR) . |
| 880058 | 6/1959 | (GB) . |
| 926638 | 5/1963 | (GB) . |

* cited by examiner

*Primary Examiner*—Milton Cano
(74) *Attorney, Agent, or Firm*—Friedrich Kueffner

(57) ABSTRACT

A continuous processing plant for the treatment of workpieces includes at least one treatment station, for example, an immersion basin, and a conveying device with a guide track in which base bodies are guided. The plant also includes a drive for driving the base bodies and at least one control unit. Each base body includes at least one connecting member suspended from the base body and a support body constructed for receiving at least one workpiece. Each support body is connected in an articulated manner to the respective connecting member. Each connecting member is mounted so as to include a lifting unit to the respective base body. Each lifting unit of each base body includes a control unit for selectively controlling the connecting member.

12 Claims, 4 Drawing Sheets

CONTINUOUS PROCESSING PLANT FOR THE TREATMENT OF WORKPIECES

BACKGROUND OF THE INVENTION

1. Field of the Invention

The present invention relates to a continuous processing plant for the treatment of workpieces. The plant includes at least one treatment station, for example, an immersion basin, and a conveying device with a guide track in which base bodies are guided. The plant also includes a drive for driving the base bodies and at least one control unit.

2. Description of the Related Art

Continuous processing plants of the above-described type are primarily used for cleaning, and for pretreatment or aftertreatment, particularly for a chemical or physical treatment and/or varnishing of workpieces, wherein the individual types of treatment can be combined in a continuous processing plant.

In known continuous processing plants of the above-described type, for lowering the conveyed workpiece from the conveying plane into an immersion basin, the guide track is lowered accordingly over a certain, non-changeable section of the conveying path. This has the disadvantage that each workpiece is subjected to the same travel with respect to time and geometry, i.e., the same treatment sequence and duration.

SUMMARY OF THE INVENTION

Therefore, it is the primary object of the present invention to provide a continuous processing plant for the treatment of workpieces which ensures for each conveyed workpiece a selective treatment sequence and/or treatment duration.

In accordance with the present invention, each base body includes at least one connecting member suspended from the base body and a support body constructed for receiving at least one workpiece. Each support body is connected in an articulated manner to the respective connecting member. Each connecting member is mounted so as to include a lifting unit to the respective base body. Each lifting unit of each base body includes a control unit for selectively controlling the connecting member.

The novel continuous processing plant according to the present invention permits a selective treatment sequence and/or treatment duration for each workpiece to be treated. This makes it possible for the first time in a continuous processing plant for the treatment of workpieces to differently treat workpieces which follow each other directly; in addition, in many specific cases of application, the present invention makes possible an untimed and steady conveying movement.

The present invention provides the following additional advantages, for example, in the case of a dip-coating plant:

- No fixed immersion curves. A variable adjustment in accordance with the immersion behavior and the emptying behavior of the workpieces is possible at the start of the operation or during the production operation solely by changing the software;
- Specifically desired pivoting, tilting or lifting movement of the support bodies can be carried out. On the one hand, this makes it possible to counteract any air bubble formation in hollow spaces of the workpieces and, on the other hand, this helps the fluids received in the immersion basins to flow out, so that the transportation of fluid from one treatment station to the next is further reduced;
- The workpieces are immersed in a specifically controlled manner, i.e., the position of the workpieces can be optimized during the immersion.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
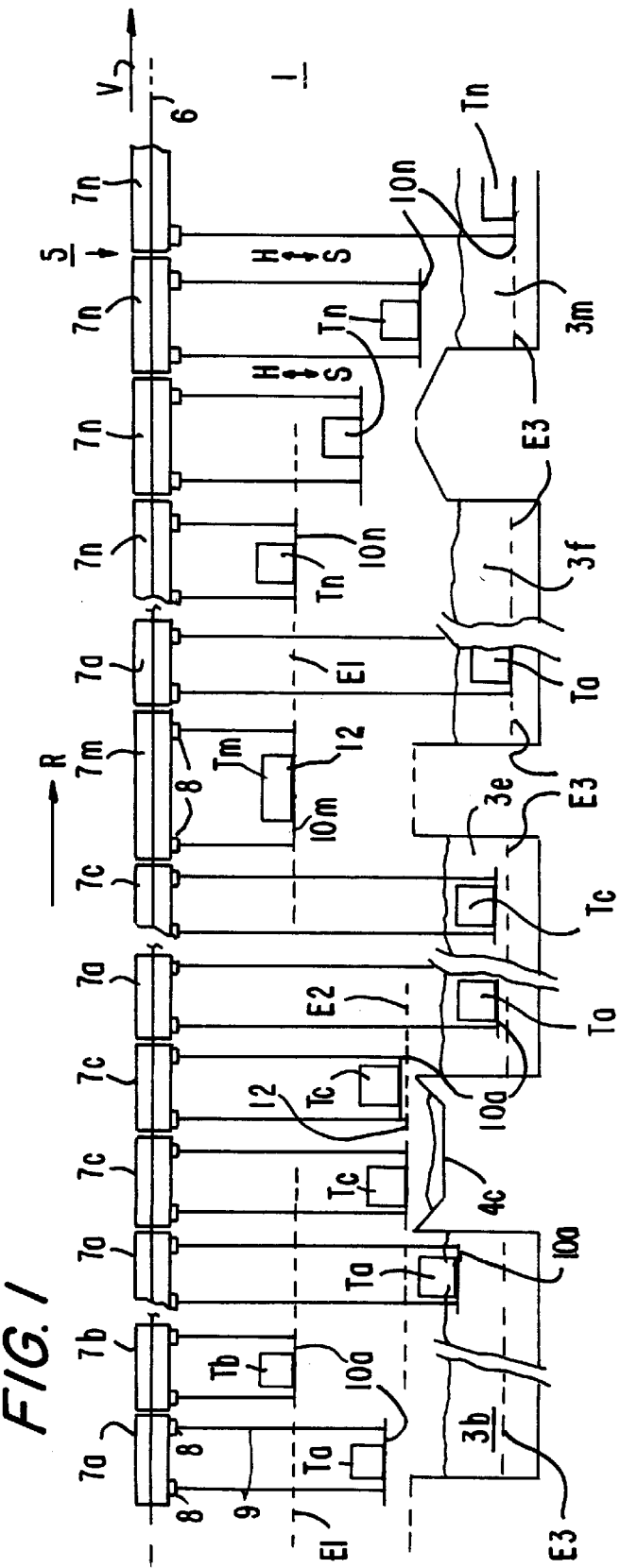
FIG. 1 is a schematic partial side view of a continuous processing plant for the treatment of workpieces with an optimized conveying device according to the present invention.
Figure 1:

FIG. 1 is a partial illustration of a continuous processing plant 1 for the treatment of workpieces equipped with an optimized novel conveying device 5. The illustrated embodiment of the continuous processing plant 1 is a combination plant for the treatment of various workpieces Ta to Tn. Specifically, the drawing shows a dip-coating plant.

In the treatment stations 2a through 2n following each other in a line, immersion basins 3c . . . 3n and troughs 4c . . . 4n are arranged in accordance with the technological treatment conditions to be taken into consideration.

A guide track 6 of the conveying device 5 is arranged above the immersion basins 3b . . . 3n and troughs 4c . . . 4n. Guided in the guide track 6 are a plurality of base bodies 7a . . . 7n which immediately follow each other and preferably form a push tow or pushing unit which is driven by conventional drive means. The conveying speed V is preferably the same at least within all treatment stations 2a . . . 2n.

Arranged at the bottom side of each base body 7a . . . 7n is at least one lifting unit 8. In the illustrated embodiment, two lifting units 8 are provided at each base body. Suspended from each lifting unit 8 is at least one connecting member 9 the lower end of which serves to support a support body 10a . . . 10n. Each connecting member 9 is connected to the respective support body 10a . . . 10n through a support 12 constructed in an articulated manner. The connecting member 9 is composed of rigid or flexible components.

The support bodies 10a . . . 10n are preferably constructed for receiving one or more workpieces Ta . . . Tn, wherein the workpieces may have different geometric dimensions. In accordance with the usual production profile of the operator of the plant a number of equal base bodies 7a . . . 7n and support bodies 10a . . . 10n or an assortment of base bodies and support bodies can be made available, wherein, at a predeterminable transfer location in the overall plant, the bodies 7a . . . 7n and 10a . . . 10n which are required at a specific time in accordance with the production flow of the workpieces can be inserted into the aforementioned push tow.

The distance between the uppermost rim of the immersion basins 3b . . . 3n and the troughs 4c . . . 4n and the bottom edge of the guided base bodies 7a . . . 7n is selected in such a way that each support body 10a . . . 10n can be selectively raised as indicated by arrow H or lowered as indicated by arrow S independently from its present position in the horizontal conveying direction into one of several transport planes, specifically the transport planes E1 and E2 shown in the drawing.

As illustrated in FIG. 1, the transport plane E1 is located above all treatment units. The transport plane E2 is located above the immersion basins 3b . . . 3n and troughs 4c . . . 4n. The support bodies 10a with workpieces Tc conveyed in this transport plane E2 travel in the area of the treatment station 2c through a spray washing unit, not shown. The water is collected in the trough 4c.

The immersion basins 3b, 3f and 3m shown in the drawing contain, for example, fluid cleaning agents, a phosphate bath or the like, or varnishing agents, wherein the concrete specific content of the immersion basins is selected in accordance with the respective technological total concept of the plant. The lowermost transport plane is the transport plane E3 shown in FIG. 1; in this transport plane E3, the support bodies 10a . . . 10n with workpiece Ta . . . Tn are completely received in the respective treatment agent.

By using the novel conveying device 5, it is possible for the first time in the continuous processing plant 1 shown in FIG. 1 to subject the various workpieces Ta to Tn to different treatment sequences or durations, preferably while maintaining the same conveying speed V in all treatment stations 2a to 2n.

While a workpiece Ta is still in the immersion basin 3b of the treatment station 2b, the workpiece Tb has already previously been lifted out of the basin 3b.

For example, after travelling over the treatment station 2b, the workpieces Tc are cleaned in the treatment station 2c by means of a spray washer and then travel through the immersion basin 3e in the treatment station 2e.

The workpiece Tm travels over the treatment stations 2b through 2e and is lowered into the immersion basin 3f in the treatment station 2f.

The workpiece Tn, after travelling over several treatment stations, is only treated in the immersion basin 3m.

Figure 2:
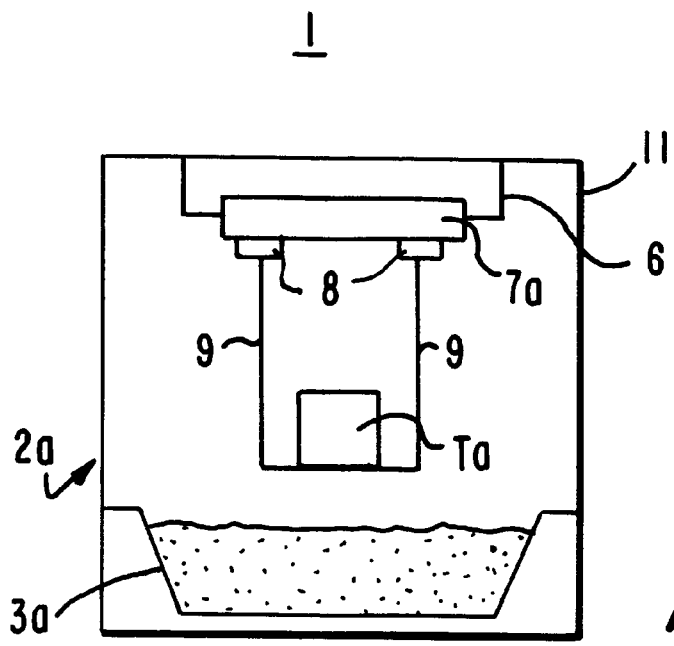
FIG. 2 is a sectional view, on a larger scale, of a first embodiment of the conveying device of the plant of FIG. 1.
Figure 2A:
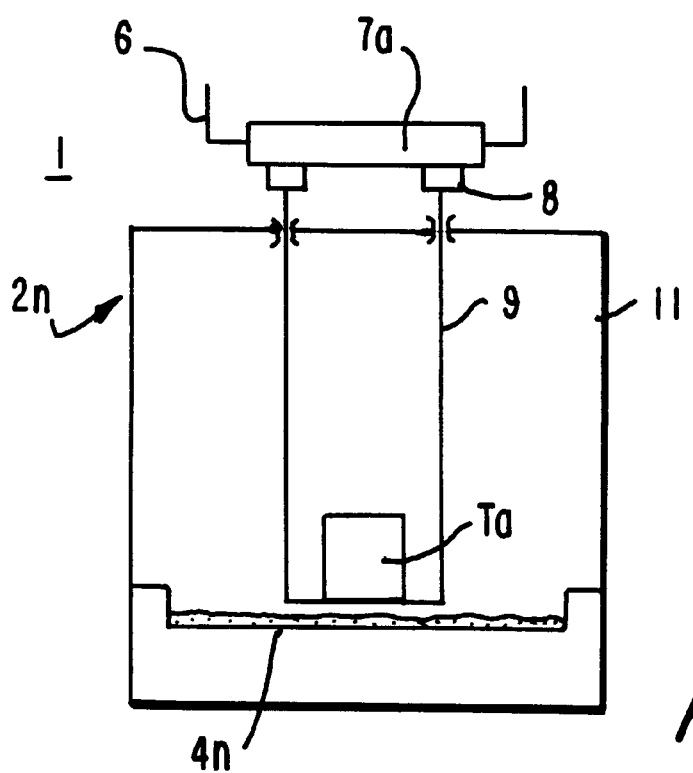
FIG. 2a is a sectional view, on a larger scale, of another embodiment of the conveying device of the plant of FIG. 1.

FIGS. 2 and 2a of the drawing show embodiments in which the treatment stations 2a through 2n are arranged in a treatment tunnel 11. In the embodiment of FIG. 2, the guide track 6 of the conveying device 5 is guided within the tunnel 11. The embodiment of FIG. 2a shows a possible arrangement of the guide track 6 outside and above the ceiling of the treatment tunnel 11, wherein the ceiling has sealable slots (not numbered) for sliding the connecting members 9 therethrough.

Figure 3:
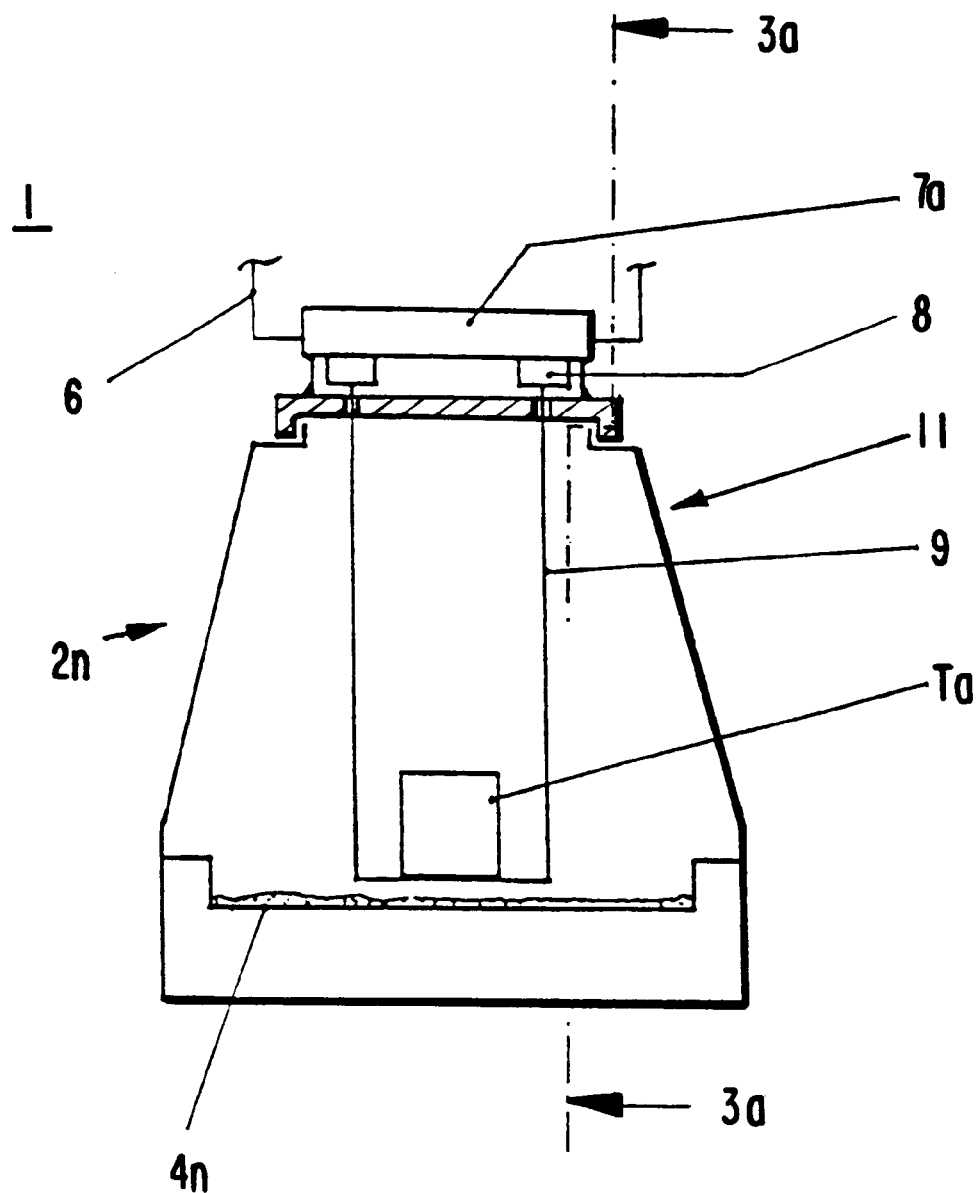
FIG. 3 is a schematic partial side view of another embodiment of the continuous processing plant.
Figure 3A:
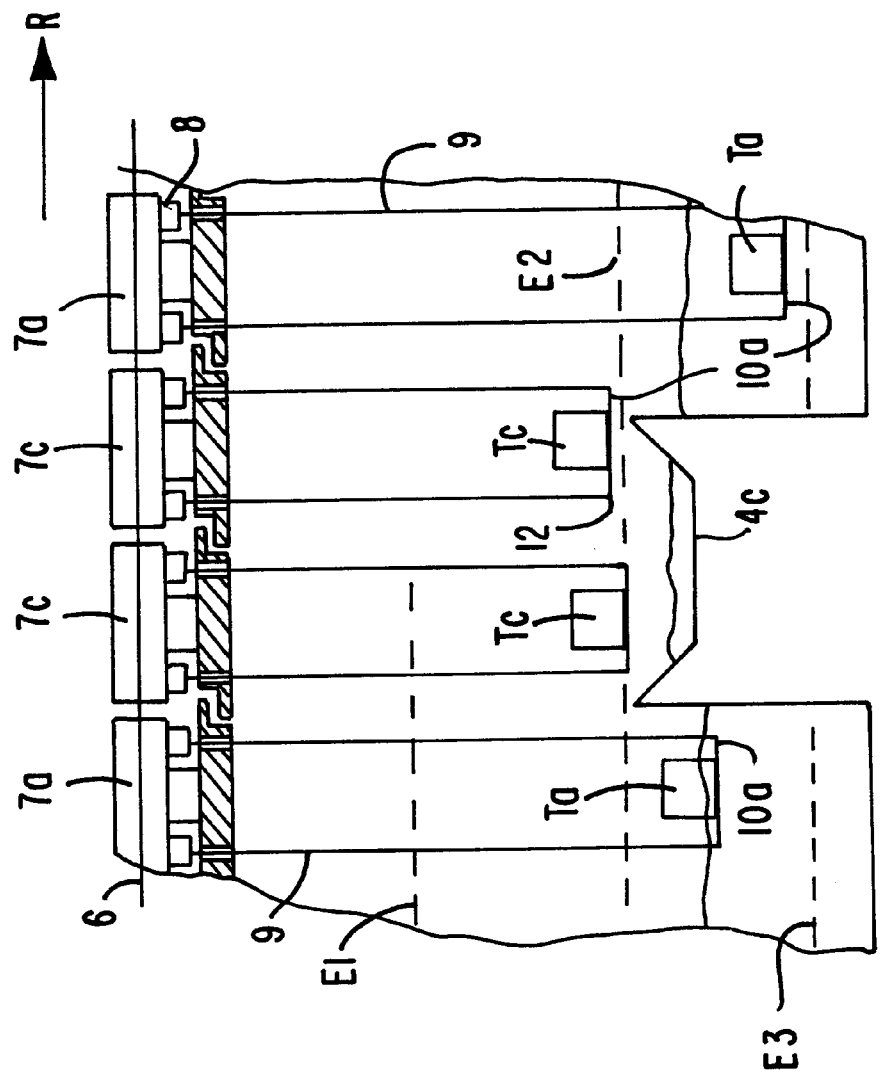
FIG. 3a is a sectional view of the conveying device of the plant of FIG. 3.

In accordance with the embodiment, shown in FIGS. 3 and 3a, the treatment stations 2a . . . 2n are also arranged within a treatment tunnel 11 and the ceiling of the tunnel 11 is formed by plates 13 mounted underneath the lifting units 8 at the guided base bodies 7a . . . 7n, wherein the plates 13 preferably overlap with their ends in the conveying direction R and the plates include sealable slots (not numbered) for guiding the connecting members 9 therethrough.

Moreover, it may under certain circumstances be advantageous that each base body 7a . . . 7n is provided with a drive means or that each drive means is provided with braking and/or accelerating means.

The drive means and the guide track 6 can be constructed in accordance with known conveyor principles, for example, roller tables, support belt conveyors, or the like, wherein the specific configuration is selected in accordance with the requirements of the user of the plant.

Preferably outside of the treatment stations 2a . . . 2n, the guide track 6 includes any required transverse movers, rotating devices, lifting devices for the base bodies 7a . . . 7n, and switches for inserting or moving the base bodies into and out of the guide track 6, and other conventional means, wherein these features are not shown in the drawings because they are known in the art.

In accordance with advantageous additional structural details to be used as required, each base body 7a . . . 7n may include the following components:

A rigid frame, preferably of steel, with frictional surfaces on a right side or left side thereof for a frictional wheel drive;

Travel rollers as well as guide rollers;

Separately controllable lifting units and locking means for immersion skids;

Current collectors for the lifting units and KTL current supply; and

Travelling control units.

All of the aforementioned components are preferably located above the ceiling formed of plates as already described above, wherein the outer edges of the ceiling are sealed with suitable means, for example, a water duct, brushes or similar means.

All essential mechanical and electrical components of the guide track 6 are located in a protected manner in conveyor housings. These housings preferably are under a slight excess pressure, so that the penetration of vapors through the slots for the connecting members is prevented.

In accordance with additional structural features, the bodies 7a . . . 7n can be equipped with shock absorbers, so that any contact between two base bodies is dampened, or vibration dampers are provided in order to reduce the vibration of mass-intensive workpieces.

The invention is not limited by the embodiments described above which are presented as examples only but can be modified in various ways within the scope of protection defined by the appended patent claims.

We claim:

1. A continuous processing plant for treating workpieces, the plant comprising:

at least one treatment station;

a conveying device comprising a guide track;

a plurality of base bodies guided in the guide track, each base body including:

at least one connecting member suspended from the base body;

a support member for receiving at least one workpiece, the support member being connected to the at least one connecting member; and a lifting unit operatively connected to the at least one connecting member, the lifting unit including a control unit for selectively controlling the raising and lowering of the support member by way of the at least one connecting member into the at least one treatment station;

means for driving the plurality of base bodies in the guide track to the at least one treatment station; and a treatment tunnel having a ceiling and sealable slots on the ceiling, the at least one treatment station arranged within the treatment tunnel, such that the guide track is located outside and above the ceiling of the treatment tunnel and the at least one connecting member extends and slides through the sealable slots.

2. The continuous processing plant according to claim 1, wherein the base bodies guided in the guide track are configured to form a push tow at least in an area of the at least one treatment station.

3. The continuous processing plant according to claim 1, wherein each base body comprises a drive means.

4. The continuous processing plant according to claim 3, wherein the drive means comprises at least one of braking and accelerating means.

5. The continuous processing plant according to claim 1, comprising means for moving the base bodies untimed and steadily at least within the at least one treatment station.

6. The continuous processing plant according to claim 1, wherein the at least one treatment station is an immersion basin.

7. A continuous processing plant for treating workpieces, the plant comprising:

at least one treatment station;

a conveying device comprising a guide track;

a plurality of base bodies guided in the guide track, each base body including:

at least one connecting member suspended from the base body;

a support member for receiving at least one workpiece, the support member being connected to the at least one connecting member; and a lifting unit operatively connected to the at least one connecting member, the lifting unit including a control unit for selectively controlling the raising and lowering of the support member by way of the at least one connecting member into the at least one treatment station;

means for driving the plurality of base bodies in the guide track to the at least one treatment station; and a treatment tunnel, the at least one treatment station arranged within the treatment tunnel, the treatment tunnel having a ceiling comprised of plates mounted underneath the lifting units at the base bodies, wherein the plates are arranged so as to overlap each other with ends thereof in a conveying direction, and wherein the plates comprise sealable slots, the connecting members extending through the sealable slots.

8. The continuous processing plant according to claim 7, wherein the base bodies guided in the guide track are configured to form a push tow at least in an area of the at least one treatment station.

9. The continuous processing plant according to claim 7, wherein each base body comprises a drive means.

10. The continuous processing plant according to claim 7, wherein the drive means comprises at least one of braking and accelerating means.

11. The continuous processing plant according to claim 7, comprising means for moving the base bodies untimed and steadily at least within the at least one treatment station.

12. The continuous processing plant according to claim 7, wherein the at least one treatment station is an immersion basin.

* * * * *